United States Patent
Kinouchi

(10) Patent No.: US 9,064,543 B2
(45) Date of Patent: Jun. 23, 2015

(54) REPRODUCING APPARATUS, DATA PROCESSING METHOD, AND REPRODUCTION SYSTEM

(75) Inventor: Takashi Kinouchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1558 days.

(21) Appl. No.: 11/431,532

(22) Filed: May 11, 2006

(65) Prior Publication Data

US 2006/0269229 A1 Nov. 30, 2006

(30) Foreign Application Priority Data

May 13, 2005 (JP) .................................. 2005-141249

(51) Int. Cl.
*G11B 27/10* (2006.01)
*G11B 27/34* (2006.01)
(Continued)

(52) U.S. Cl.
CPC ................ *G11B 27/34* (2013.01); *H04N 5/765* (2013.01); *G11B 27/105* (2013.01); *H04N 5/4401* (2013.01); *H04N 21/4122* (2013.01); *H04N 21/41407* (2013.01); *H04N 21/42661* (2013.01); *H04N 21/4325* (2013.01); *H04N 21/43632* (2013.01); *H04N 21/44231* (2013.01);
(Continued)

(58) Field of Classification Search
CPC .............. H04N 5/765; H04N 21/4126; H04N 21/4622; H04N 21/42204; G06F 3/0482; G05B 15/02
USPC .................................. 715/740–741; 386/278
See application file for complete search history.

(56) References Cited

U.S. PATENT DOCUMENTS 6,104,334 A   8/2000  Allport
6,590,730 B2 * 7/2003  Veltchev et al. ................ 360/69

(Continued)

FOREIGN PATENT DOCUMENTS

EP    1 381 026 A1   1/2004
JP    05-103284      4/1993

(Continued)

OTHER PUBLICATIONS

Microsoft Corp; "Windows Media Player 9 Series"; Jun. 7, 2003; XP002356255.

(Continued)

*Primary Examiner* — Gelek W Topgyal
(74) *Attorney, Agent, or Firm* — Finnegan, Henderson, Farabow, Garrett & Dunner, L.L.P.

(57) ABSTRACT

A content data recording and reproducing apparatus including a content data output device, enabling the content to be reproduced to be determined while displaying a content list on an external output device, communicates with the output device, and controls the output device to output data. The apparatus has a data line configured to transfer data among connected parts, a recording part on which content data is recorded, a reproduction and output part configured to reproduce and outputting the content data transferred from the recording part, an interface for communicating with the output device, an operation part connected to the data line, a display configured to display operation screen data including attribute information of the content data, and a control part configured to transmit the content data read out from the recording part to the output device via the interface based on an instruction input from the operation part and suspend the display of the operation screen when communication with the output device is established.

10 Claims, 10 Drawing Sheets

(51) Int. Cl.
*H04N 21/41* (2011.01)
*H04N 21/43* (2011.01)
*H04N 5/765* (2006.01)
*H04N 21/414* (2011.01)
*H04N 21/426* (2011.01)
*H04N 21/432* (2011.01)
*H04N 21/4363* (2011.01)
*H04N 21/442* (2011.01)
*H04N 21/443* (2011.01)
*H04N 21/472* (2011.01)
*H04N 21/482* (2011.01)
*H04N 5/44* (2011.01)

(52) U.S. Cl.
CPC ..... *H04N21/4436* (2013.01); *H04N 21/47214* (2013.01); *H04N 21/4825* (2013.01)

(56) References Cited

U.S. PATENT DOCUMENTS

| | | | |
|---|---|---|---|
| 6,691,199 B1* | 2/2004 | Yang | 710/305 |
| 6,844,899 B2* | 1/2005 | Oeda et al. | 348/333.13 |
| 6,882,299 B1 | 4/2005 | Allport | |
| 6,937,732 B2* | 8/2005 | Ohmura et al. | 381/86 |
| 7,047,333 B2* | 5/2006 | Leung et al. | 710/100 |
| 7,074,999 B2* | 7/2006 | Sitrick et al. | 84/477 R |
| 7,333,722 B2* | 2/2008 | Kushibe et al. | 386/126 |
| 7,363,028 B2* | 4/2008 | de Clerq et al. | 455/414.1 |
| 7,444,061 B2* | 10/2008 | Naitoh | 386/46 |
| 7,535,465 B2* | 5/2009 | Morse et al. | 345/204 |
| 8,271,333 B1* | 9/2012 | Grigsby et al. | 705/14.73 |
| 8,291,134 B2* | 10/2012 | Morohashi | 710/33 |
| 2003/0110926 A1* | 6/2003 | Sitrick et al. | 84/477 R |
| 2003/0182139 A1* | 9/2003 | Harris et al. | 705/1 |
| 2004/0031377 A1 | 2/2004 | Oshiyama et al. | |
| 2004/0151327 A1 | 8/2004 | Marlow | |
| 2004/0184588 A1* | 9/2004 | Yueh | 379/100.15 |
| 2005/0181778 A1* | 8/2005 | Sugi | 455/419 |
| 2005/0187976 A1* | 8/2005 | Goodman et al. | 707/104.1 |
| 2010/0332994 A1* | 12/2010 | Istvan et al. | 715/740 |

FOREIGN PATENT DOCUMENTS

| | | |
|---|---|---|
| JP | 11-275503 | 10/1999 |
| JP | 2005-080043 | 3/2005 |
| JP | 2005-84672 | 3/2005 |
| JP | 2006-209258 | 8/2006 |

OTHER PUBLICATIONS

Toshiba; "User's Manual, Satellite 1000" [Online] 2002, XP002399129; Retrieved from the Internet: URL:http://uk.computers.toshiba-europe.com/cgi-bin/ToshibaCSG/download_manuals.jsp?service=UK [retrieved on Sep. 15, 2006].

Creative; "Portable Media Center" [Online] 2004, XP002399160; Retrieved from the Internet: URL:http://us.creative.com/support/downloads/welcome.asp?type=manuals [retrieved on Sep. 15, 2006].

\* cited by examiner

FIG. 2

| ID OF TRACK DATA | ARTIST NAME | ALBUM NAME | TRACK NAME |
|---|---|---|---|
| M_ID1 | AR_N1 | AL_N1 | T_N1 |
| M_ID2 | AR_N2 | AL_N2 | T_N2 |
| M_ID3 | AR_N3 | AL_N3 | T_N3 |
| M_ID4 | AR_N4 | AL_N4 | T_N4 |
| M_ID5 | AR_N5 | AL_N5 | T_N5 |
| ... | ... | ... | ... |

FIG. 3

| ID OF TRACK DATA | ARTIST NAME | ALBUM NAME | TRACK NAME | START | END | BOOKMARK |
|---|---|---|---|---|---|---|
| M_ID1 | AR_N1 | AL_N1 | T_N1 | 0:00 | 3:25 | ○ |
| M_ID2 | AR_N1 | AL_N1 | T_N2 | 3:26 | 6:52 | × |
| ... | ... | ... | ... | ... | ... | ... |
| M_IDX | AR_NX | AL_NX | T_NX | 12:22 | 15:23 | ○ |

REPRODUCING APPARATUS, DATA PROCESSING METHOD, AND REPRODUCTION SYSTEM

CROSS REFERENCES TO RELATED APPLICATIONS

The present invention contains subject matter related to Japanese Patent Application No. 2005-141249 filed in the Japan Patent Office on May 13, 2005, the entire contents of which being incorporated herein by reference.

BACKGROUND OF THE INVENTION

1. Field of the Invention

The present invention relates to a reproducing apparatus, a data processing method, and a reproduction system communicating with an external output device and able to make the external output device reproduce and output the content data.

2. Description of the Related Art

In recent years, a mobile recording and reproducing apparatus mounting a large capacity recording apparatus has been developed. Such an apparatus compresses and records audio, movies, still images, and other content data and decodes the compressed data to reproduce the content data. The content data to be reproduced is output from a small sized liquid crystal monitor, headphone terminal, small sized speakers, and other output devices mounted on the mobile recording and reproducing apparatus.

However, the small sized output devices mounted on the mobile recording and reproducing apparatus as described above had disadvantages such as difficult viewing, poor sound quality, and troublesome headphones. In order to overcome the above disadvantages, output using an external output device such as speakers is considered, but even in that case, it is necessary to view the output of a small sized output device in order to determine which content is to be reproduced, therefore the disadvantage such as difficult viewing of the small sized output device remains.

SUMMARY OF THE INVENTION

It is therefore desirable to provide a reproducing apparatus, a data processing method, and a reproduction system able to utilize the reproduction output function of an external output device.

According to an embodiment of the invention, there is provided a reproducing apparatus having: a data line configured to transfer data among connected parts, a recording part on which content data is recorded, a reproduction and output part configured to reproduce the content data transferred from the recording part via the data line and output the same, an interface for communicating with an external output device, an operation part connected to the data line, a display configured to display operation screen data including attribute information of the content data, and a control part configured to transmit the content-data read out from the recording part to the external output device via the interface based on an instruction input from the operation part and suspend the display of the operation screen onto the display, when communication with the external output device is established via the interface.

Preferably, the control part may make the reproduction and output part may reproduce and output the content data read out from the recording part based on an instruction input from the operation part when judging that communication with the external output device has not been established.

Alternatively, the control part may suspend the display of the selection screen on the display and may make the external output device transmit the operation screen data through the interface when judging that communication with the external output device has been established.

More preferably the control part may update data relating to the operation screen based on the instruction from the operation part.

Alternatively, more preferably, the operation display data may include list data indicating a plurality of content data.

Still more preferably, the control part may read out selected content data and make the external output device transmit the read selected content data through the interface when receiving an operation command for selecting predetermined content data from the list data from the operation part.

Alternatively still more preferably, the recording part may record bookmark data indicating whether each of the content data has been bookmarked, and the control part may generate a list of bookmarked data as operation screen data based on the bookmark data read out from the recording part and may make the external output device transmit the operation screen data through the interface, when establishing communication with the external output device.

Alternatively, the recording part may record image data, and the control part may transmit the image data read out from the recording part to the external-output device through the interface linked with the operation screen data and may make the external output device display an operation screen in accordance with the operation screen data having an image according to the image data as a background.

According to another embodiment of the invention, there is provided a data processing method executed by a content reproducing apparatus including a display, the method including: establishing communication with an external output device, suspending the display of attribute information of content data onto the display, reading the content data designated by an operation instruction from a recording part when receiving the operation instruction and transmitting the same to the external output device by the communication established at the establishing, and controlling the reproduction output by the external output device of the content data transmitted at the reading.

According to other embodiment of the invention, there is provided a content reproduction system configured by a content reproducing apparatus and an external output device communicating with the content reproducing apparatus, wherein the reproducing apparatus is configured by a data line configured to transfer data among connected parts, a recording part on which content data is recorded, a reproduction and output part configured to reproduce the content data transferred from the recording part via the data line and output the same, an interface for communicating with an outside, an operation part connected to the data line, a display configured to display operation screen data including attribute information of the content data, and a control part configured to transmit the content data read out from the recording part to the external output device via the interface based on an instruction input from the operation part and suspend the display of the operation screen onto the display, when communication with the external output device is established via the interface, and the external output device is configured by an input part receiving as input the data from the reproducing apparatus via the interface, and an output part configured to output the content data transmitted from the reproducing apparatus via the interface.

BRIEF DESCRIPTION OF THE DRAWINGS

These and other objects and features of the present invention will become clearer from the following description of the preferred embodiments given with reference to the attached drawings, wherein:

FIG. 2 is a diagram for explaining attributes assigned to track data stored by the mobile audio player of the first embodiment;

FIG. 3 is a diagram showing an example of a playlist of the track data stored in a hard disk drive;

DESCRIPTION OF PREFERRED EMBODIMENTS

Below, an explanation will be given of mobile audio players according to embodiments of the present invention with reference to the drawings.

First Embodiment

Figure 1:
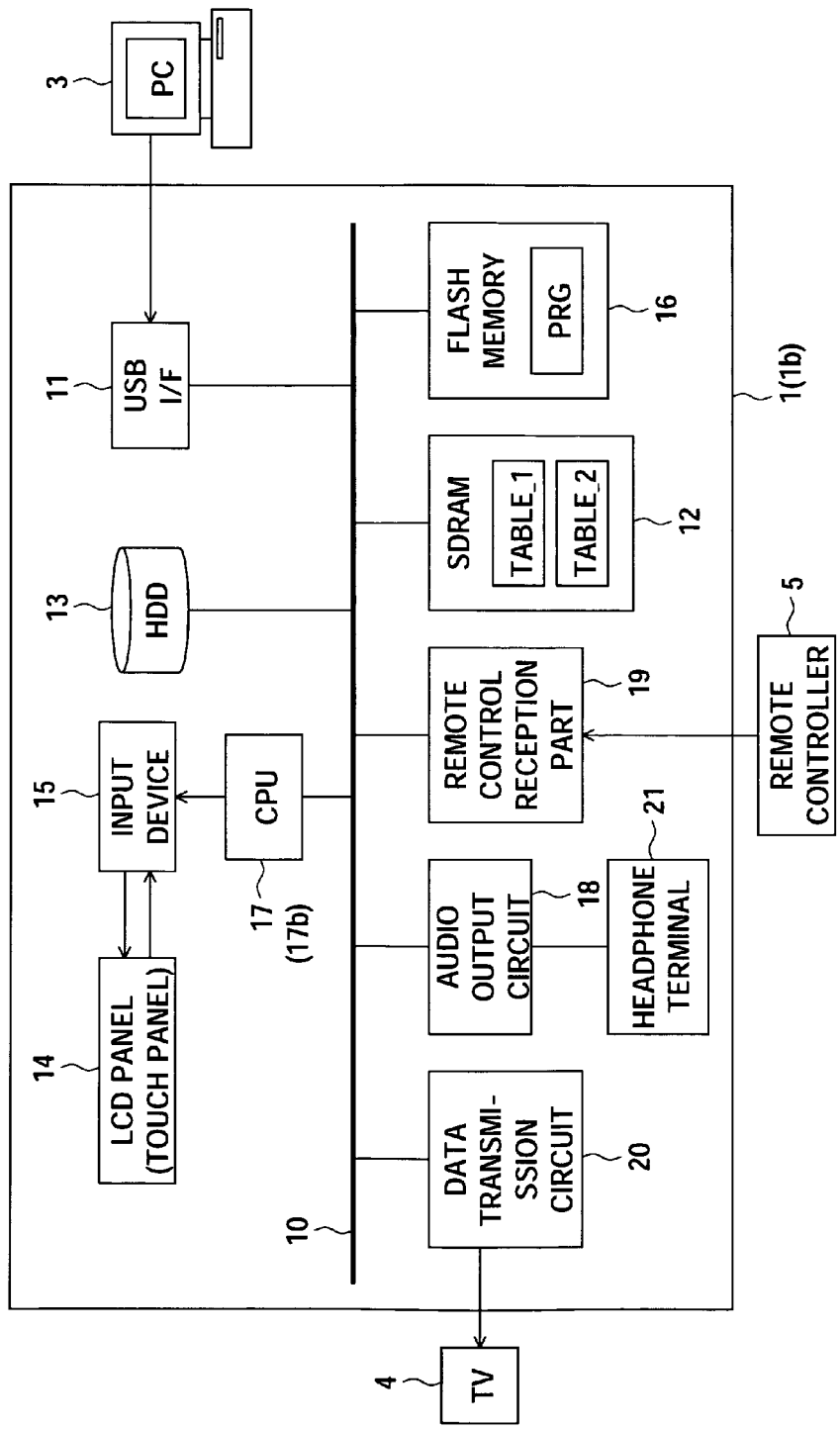
FIG. 1 is a view of the configuration of a mobile audio player according to a first embodiment of the present invention.

First, the correspondence between components of the present embodiment and components of the present invention will be explained. The track data of the present embodiment is an example of the content data of the present invention. Further, a hard disk drive (HDD) 13 of the present embodiment shown in FIG. 1 is an example of the recording means of the present invention, an audio output device 18 is an example of the reproducing and outputting means of the present invention, a data transmission circuit 20 is an example of the interface of the present invention, a liquid crystal display (LCD) panel 14 is an example of the display of the present invention, a television set (TV) 4 is an example of the external output device of the present invention, and a remote controller 5 is an example of the operating means of the present invention. Further, a program PRG shown in FIG. 1 is an example of the program of the present invention.

FIG. 1 is a view of the configuration of a mobile audio player 1 according to an embodiment of the present invention. As shown in FIG. 1, the mobile audio player 1 has, for example, a universal serial bus (USB) interface 11, synchronous dynamic random access memory (SDRAM) 12, HDD 13, LCD panel 14, input device 15, flash memory 16, central processing part (CPU) 17, audio output circuit 18, remote control reception part 19, data transmission circuit 20, and headphone terminal 21. The USB interface 11, SDRAM 12, HDD 13, flash memory 16, CPU 17, audio output device 18, remote control reception part-19, and data transmission circuit 20 are connected via for example a data line 10.

The USB interface 11 is connected to for example a personal computer 3 and inputs/outputs data with the personal computer 3. The SDRAM 12 temporarily stores data etc. relating to the processing of the CPU 17.

The HDD 13 stores compressed track data (music data) etc. This track data etc. are written from the personal computer 3 into the HDD 13 via the USB interface 11. The HDD 13 has a storage capacity of for example 20 GB and can store the track data of about 10,000 tracks (700 compact disks' worth of data) compressed by adaptive transform acoustic coding (ATRAC) 3 or the like. FIG. 2 is a diagram for explaining the attributes assigned to the track data stored by the mobile audio player 1 of the present embodiment. Each of the track data stored in the HDD 13 (hereinafter also simply referred to as "track data") is linked, as shown in FIG. 2, with identification data M_ID, artist name data AR_N, album name data AL_N, and track name data T_N by management data TABLE_1. The management data TABLE_1 is stored in the HDD 13 and read out at the time of for example startup of the mobile audio player 1.

The LCD panel 14 is provided on for example a front surface of the mobile audio player 1. Various screens are displayed by the CPU 17. As the main screen displayed on the LCD panel 14, for example, there are a menu screen, a track selection screen, a setup screen, and a reproduction screen. These screens are switched in response to a key operation of the user. A touch panel is mounted on the LCD panel 14. It detects the position on the screen touched by the user by his finger etc. and outputs a detection position signal S14 indicating the position to the CPU 17.

The input device 15 is including various keys provided in cases of the mobile audio player 1 and operated by the user. The user can input data from the touch panel mounted on the LCD panel 14 or the input device 15 and store it in the HDD 13.

The flash memory 16 stores for example the program PRG defining the operation of the CPU 17.

The audio output circuit 18 outputs an audio signal in accordance with the track data detected by the CPU 17 to the headphone terminal 21.

The remote control reception part 19 receives the signal from an external output device, for example, the remote controller 5 of the TV 4.

The data transmission circuit 20 transmits the management data TABLE_1 stored in the HDD 13, the control data, the track data, etc. to the TV 4.

The CPU 17 centrally controls the operation of the mobile audio player 1 in the present embodiment based on the program PRG read out from the flash memory 16. Further, the CPU 17 reads out the selected track data from, the HDD 13 and decodes and outputs this to the audio output circuit 18.

Next, an explanation will be given of the playlist of the mobile audio player 1 of the present embodiment with reference to FIG. 3. FIG. 3 is a diagram showing an example of the playlist of the track data stored in the HDD 13.

As shown in FIG. 3, the playlist records the artist name, the track name, the album name, a start time "Start", an end time "End", and bookmark information "Bookmark" for a certain track A.

As this playlist, one automatically generated by the CPU 17 based on the management data TABLE_1 or one generated on application software of a PC and transferred to the mobile audio player is stored in the HDD 13. A sequence of tracks described in the playlist can be set by the user. Various playlists can be prepared from a variety of viewpoints.

The start time "Start" represents the start time of a track on that playlist, while the end time "End" represents the end time of the track on the playlist.

The bookmark information "Bookmark" is information expressing whether or not a track is preferred by the user. By adding bookmark information to a track preferred by the user, the information of the preferred tracks of the user can be judged from the playlist. The user can add the bookmark information from time to time by using the LCD panel 14 or input device 15.

In the present embodiment, the mobile audio player 1 has two operation formats according to whether or not it is connected with the TV 4. In the following description, these two operation formats will be explained. Note that, the mobile audio player 1 is connected with the TV 4 by for example an AV cable.

Figure 4:
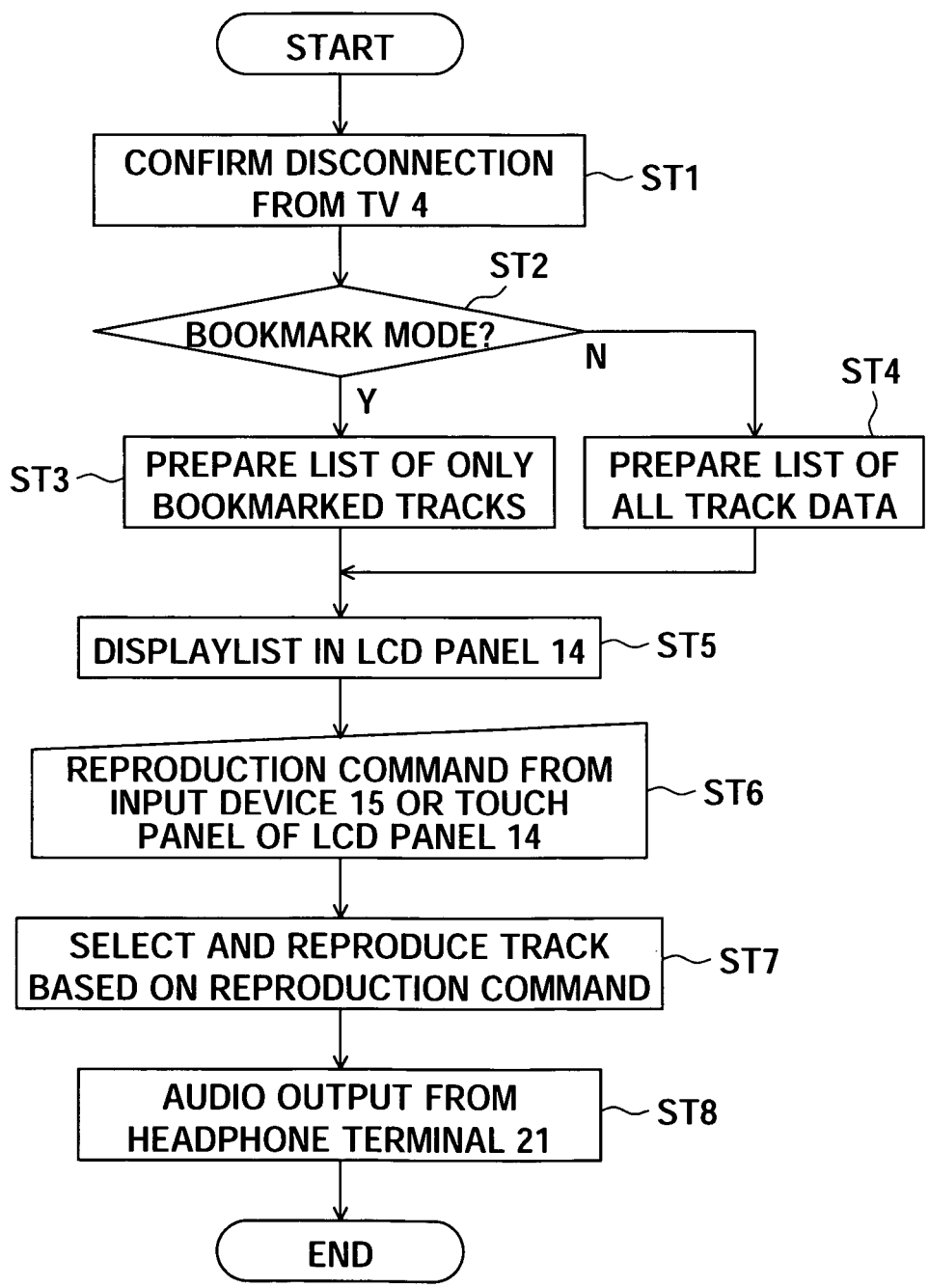
FIG. 4 is a flow chart for explaining an example of operation in a case where the mobile audio player is not connected with a television set.

A first operation format is a case where the mobile audio player 1 is not connected with the TV, in which the mobile audio player 1 reproduces the track data, and outputs audio by using the audio output circuit 18. FIG. 4 is a flow chart for explaining an example of the operation in a case where the mobile audio player 1 is not connected with the TV.

Step ST1

The CPU 17 performs for example a check of an AV output cable terminal and confirms that the mobile audio player 1 is not connected with the TV.

Step ST2

The CPU 17 decides if the mobile audio player 1 is in a bookmark mode, proceeds to step ST3 in the case of the bookmark mode, while proceeds to step ST4 not in the case of the bookmark mode. The bookmark mode is the mode in which only tracks given the above bookmark information are reproduced.

Step ST3

The CPU 17 prepares the list data of only the tracks given the bookmark information among tracks stored in the HDD 13. The list data is data including the above playlist.

Step ST4

The CPU 17 prepares a list of all tracks stored in the HDD 13.

Step ST5

The CPU 17 displays the list prepared at step ST3 or step ST4 on the LCD panel 14.

Step ST6

The user refers to the list displayed on the LCD panel 14, determines the track to be reproduced, then inputs a reproduction command from the input device 15 or the touch panel of the LCD panel 14.

Step ST7

The CPU 17 selects and reproduces the track data to be reproduced from the HDD 13 in response to the reproduction command of step ST3.

Step ST8

The audio output circuit 18 outputs the track reproduced at step ST7 through the headphone terminal 21.

The second operation format is the case where the mobile audio player 1 is connected with the TV 4, and the mobile audio player 1 controls the TV 4 to reproduce and output the track data.

Figure 5:
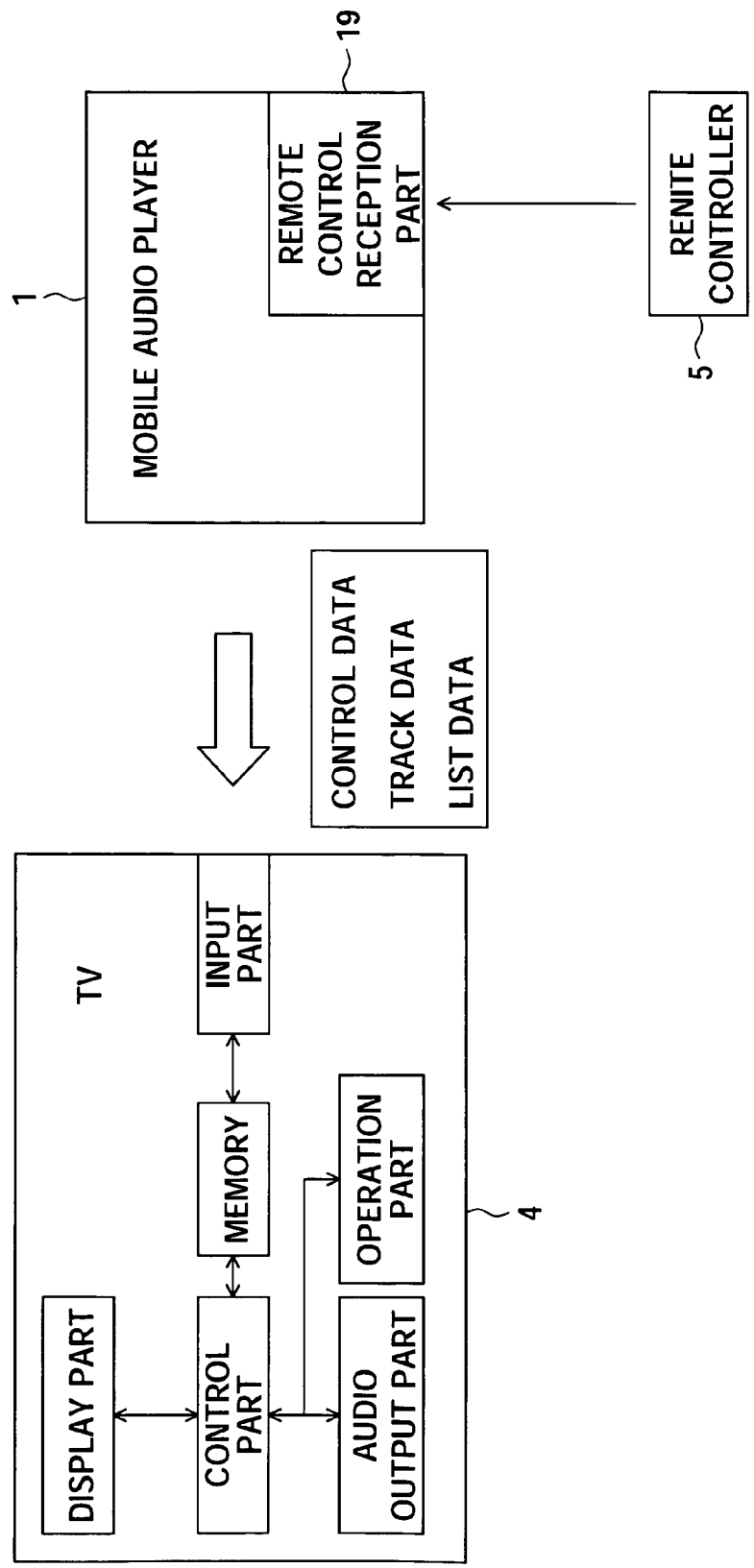
FIG. 5 is a conceptual view of a case where the mobile audio player of the present embodiment is connected with a television set.

FIG. 5 is a conceptual diagram of the case where the mobile audio player 1 of the present embodiment is connected with the TV. As shown in FIG. 5, the mobile audio player 1 transmits the list data, the control data, and the track data to the TV 4. The list data is data including the above playlist.

Figure 6:
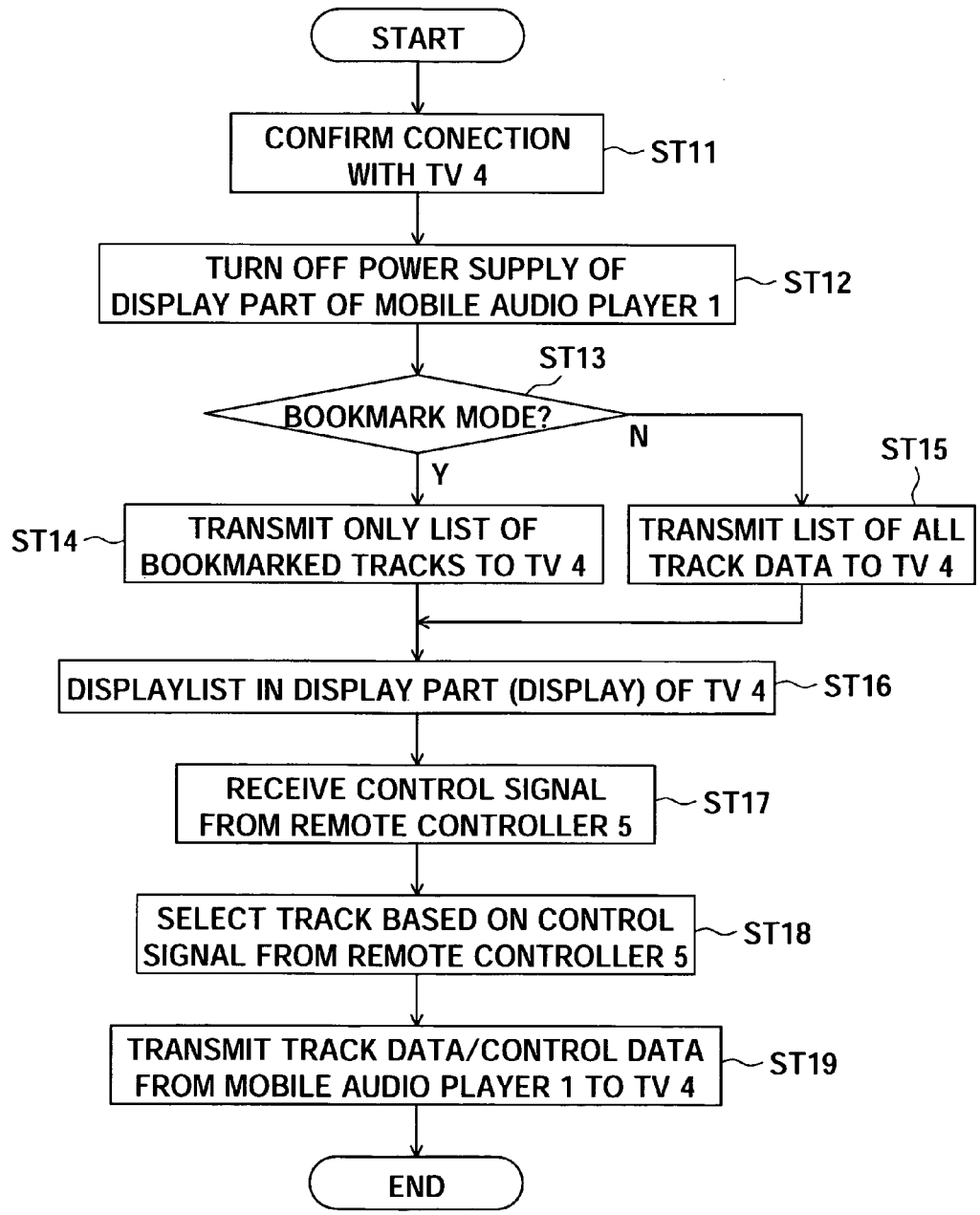
FIG. 6 is a flow chart for explaining an example of the operation in the case where the mobile audio player is connected with a television set.

FIG. 6 is a flow chart for explaining an example of the operation in the case where the mobile audio player 1 is connected with the TV.

Step ST11

The CPU 17 performs for example a check of the AV output cable terminal and confirms that the mobile audio player 1 is connected with the TV 4.

Step ST12

When the connection is confirmed at step ST11, the CPU 17 turns off the power supply of the display part (LCD panel 14) of the mobile audio player 1.

Step ST13

The CPU 17 decides if the mobile audio player 1 has entered the bookmark-mode, proceeds to step ST14 in the case of the bookmark mode, while proceeds to step ST15 not in the case of the bookmark mode.

Step ST14

The CPU 17 prepares list data of only the tracks given the bookmark information among tracks stored in the HDD 13. The data transmission circuit 20 transmits this as the list data to the TV 4.

Step ST15

The CPU 17 prepares a list of all tracks stored in the HDD 13. The data transmission circuit 20 transmits this as the list data to the TV 4.

Step ST16

Figure 7:
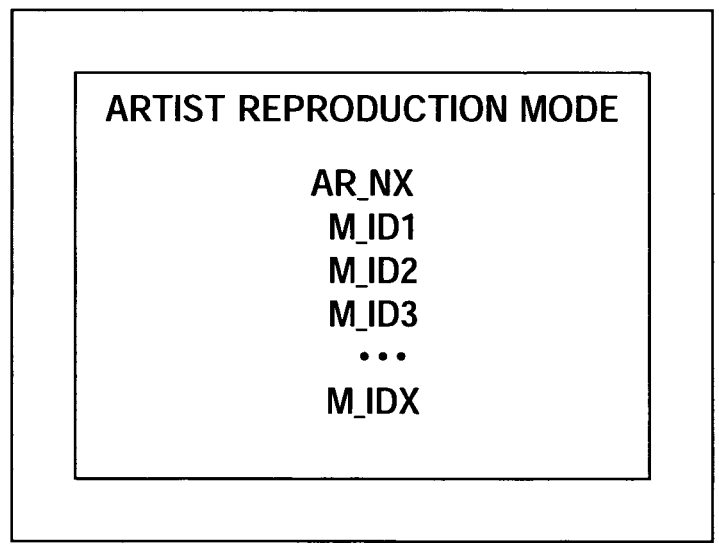
FIG. 7 is a diagram showing an example of display of a display of a television set according to the present embodiment.

The TV 4 receiving the list data at step ST14 and step ST15 displays the list and the image on the display part (display). FIG. 7 is a diagram showing an example of display of the display of the TV 4 according to the present embodiment. The user refers to the list displayed on the display of the TV 4, determines the track to be reproduced, and transmits the instruction of reproduction via the remote controller 5.

Step ST17

The remote control reception part 19 receives the control signal from the remote controller 5 transmitted at step ST16. The control signal from the remote controller 5 will be explained later.

Step ST18

The CPU 17 selects the track data to be reproduced based on the control signal from the remote controller 5.

Step ST19

The data transmission circuit 20 transmits the track data selected at step ST18 and the control data to the TV 4. The TV 4 receiving the track data and the control data reproduces the track and outputs it from the audio output part (speaker).

Next, an explanation will be given of the control signal issued by the remote controller 5. The remote controller 5 is a remote controller for operating the TV 4, therefore many of the buttons are for operating the TV 4. However, the TV 4 has entered into the external input mode when displaying the list data etc. from the mobile audio player 1. In this case, unused buttons exist on the remote controller 5. If signals corresponding to these buttons are previously stored in the SDRAM 12 etc. as a remote controller correspondence table TABLE_2, when the mobile audio player utilizes the TV 4 as an external output device, it becomes possible to operate the mobile audio player 1 by using the remote controller 5 without operating the TV 4.

As explained above, the mobile audio player 1 of the present embodiment is connected with the TV 4 and therefore can make the TV 4 display information such as the track list and can make it output the audio from the speaker of the TV according to the remote controller 5 operated by the user. Namely, the remote operation of both of the TV 4 and the mobile audio player 1 can be carried out by one remote controller 5 of the TV 4, therefore trouble in operation can be omitted. Further, track selection can be carried out on the display of the TV 4 larger than the LCD panel 14 of the mobile audio player 1, and the selected track can be output from the speaker of the TV 4, therefore a favorite track can be easily listened to by a home theater system including a TV. Further, when the mobile audio player 1 and the TV 4 are connected, the LCD panel 14 of the mobile audio player 1 is turned off and the list is displayed on the display of the TV in place of this, therefore the power consumption of the mobile audio player 1 due to the track selection operation of the user can be suppressed. Further, by the bookmark mode, the user can display a list of only the preferred tracks on the TV 4, so the trouble of retrieving the track data to be reproduced can be eliminated.

Second Embodiment

In the present embodiment, an explanation will be given of an example where the remote controller 5 of the TV 4 is not used, but the mobile audio player 1a itself is used as the remote controller when connecting the mobile audio player 1a according to the present embodiment and the TV 4 and reproducing a track. Note that, in the present embodiment, the mobile audio player 1a and the TV 4 are connected by for example infrared ray communication etc.

The correspondence between the components of the present embodiment and the components of the present invention will be explained. The mobile audio player 1a of the present embodiment is an example of the operating means of the present invention.

Figure 8:
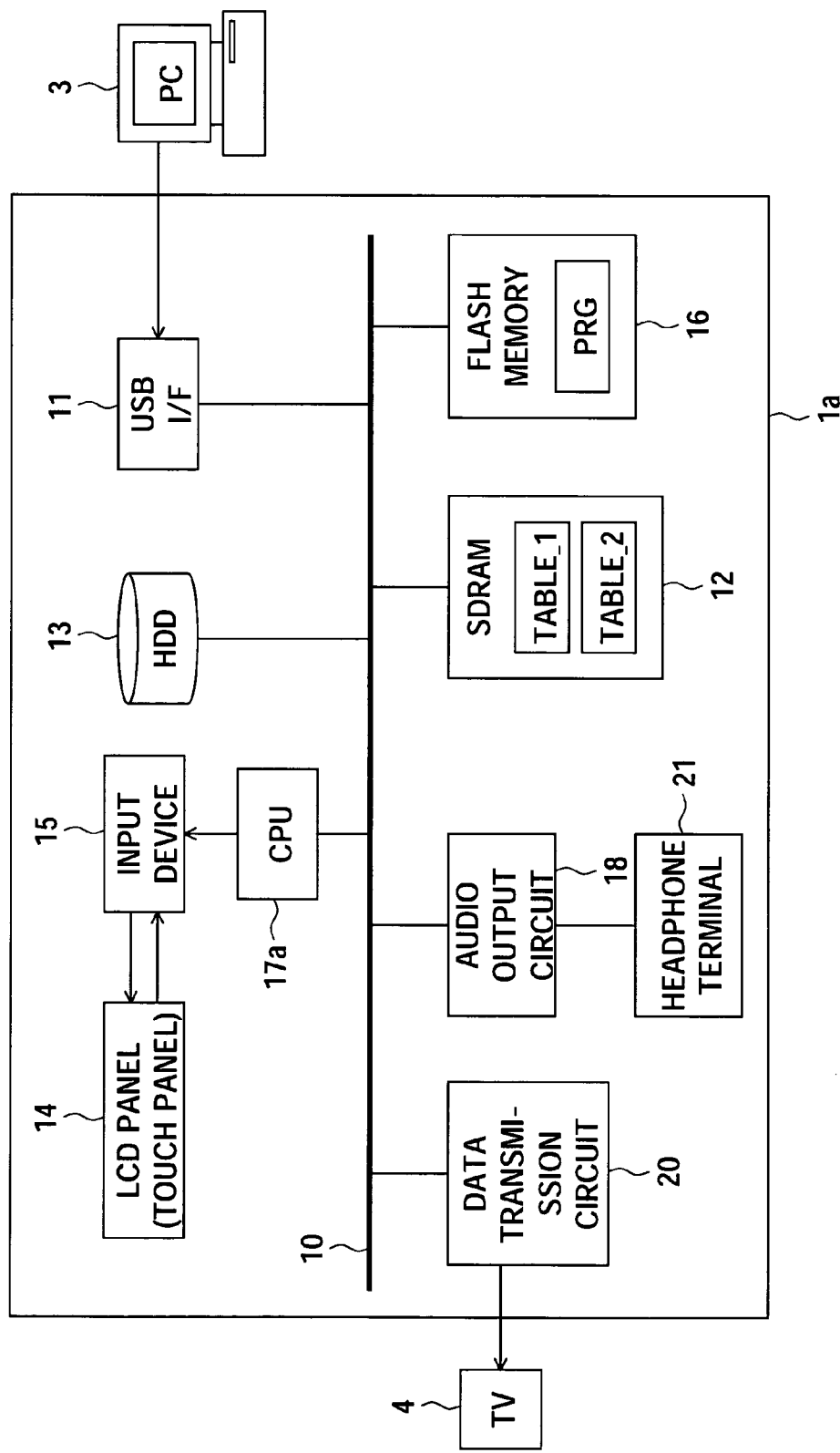
FIG. 8 is a view of the configuration of a mobile audio player according to the present embodiment.

FIG. 8 is a view of the configuration of a mobile audio player 1a according to the present embodiment. As shown in FIG. 8, the mobile audio player 1a has for example a USB interface 11, SDRAM 12, HDD 13, LCD panel 14, input device 15, flash memory 16, CPU 17a, audio output device 18, data transmission circuit 20, and headphone terminal 21. The USB interface 11, SDRAM 12, HDD 13, LCD panel 14, input device 15, flash memory 16, CPU 17a, audio output device 18, data transmission circuit 20, and headphone terminal 21 of the present second embodiment are the same as the USB interface 11, SDRAM 12, HDD 13, LCD panel 14, input device 15, flash memory 16, audio output device 18, and headphone terminal 21 of the first embodiment.

Figure 9:
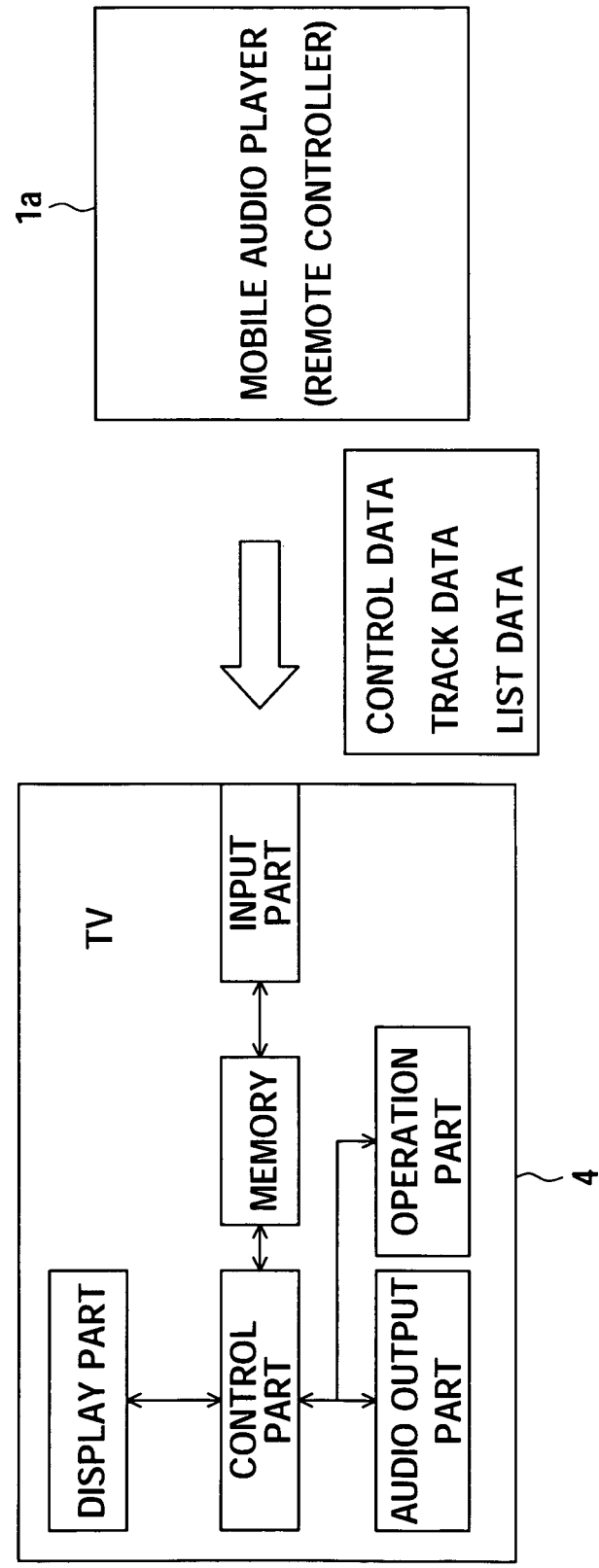
FIG. 9 is a conceptual diagram in the case where the mobile audio player of the present embodiment is connected with a television set.

Next, an explanation will be given of the AV output function of the mobile audio player 1a according to the present embodiment with reference to FIG. 9. FIG. 9 is a conceptual diagram of the case where the mobile audio player 1a of the present embodiment is connected with the TV. As shown in FIG. 9, the mobile audio player 1a transmits list data, control data, and track data to the TV 4.

Figure 10:
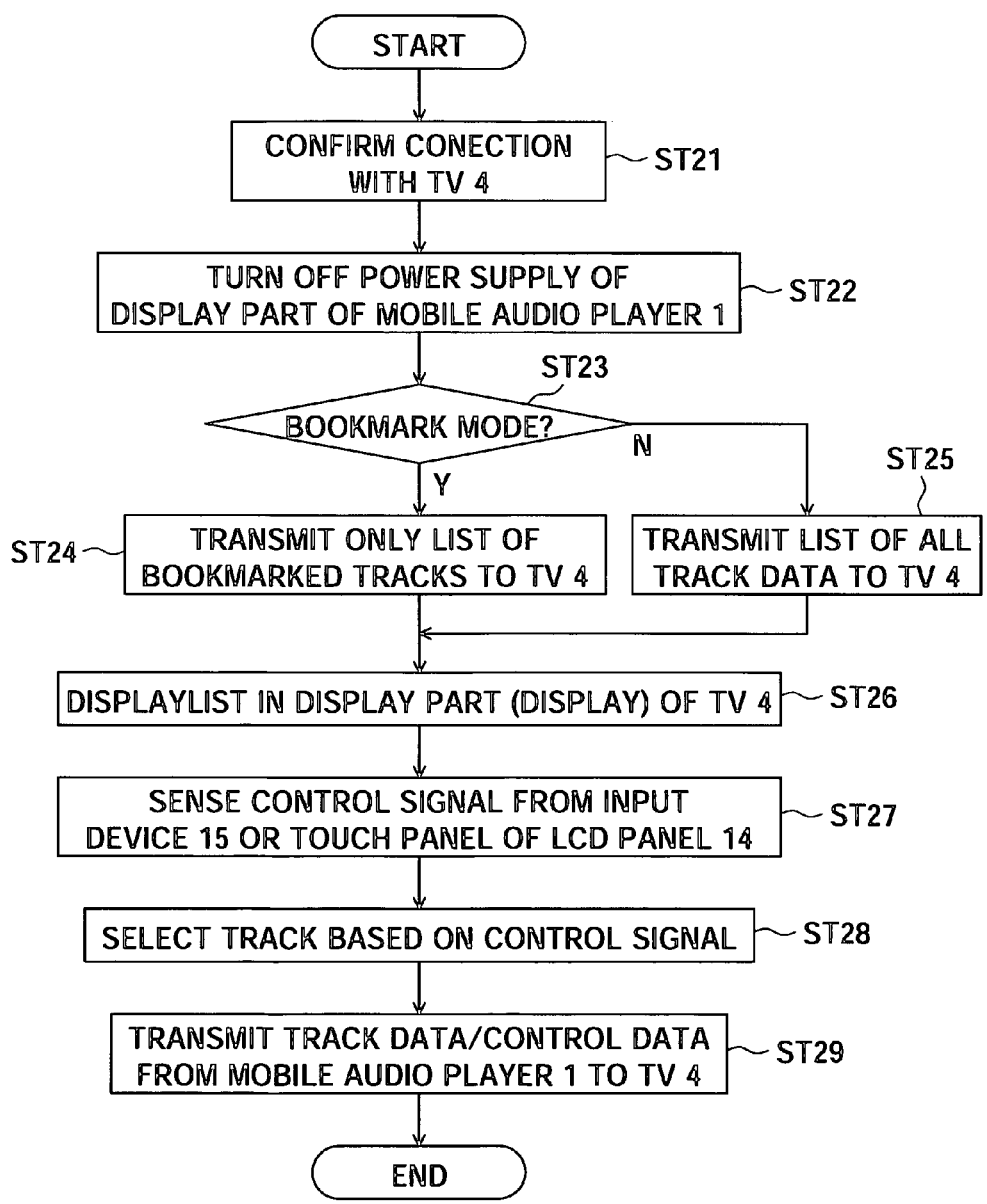
FIG. 10 is a flow chart for explaining an example of the operation in the case where the mobile audio player is connected with a television set.

FIG. 10 is a flow chart for explaining an example of the operation in the case where the mobile audio player 1a is connected with the TV. Note that the example of operation in the case where the mobile audio player 1a is not connected with the TV is the same as the example of operation of the mobile audio player 1 explained with reference to FIG. 4 in the first embodiment.

Step ST21 to step ST26 in FIG. 10 correspond to step ST11 to step ST16 in the first embodiment, therefore an explanation will be given of step 27 and the following steps here.

Step ST27

The user operates the input device 15 or the touch panel of the LCD panel 14, selects the track to be reproduced from the list displayed in the display, and inputs it as the control signal.

Step ST28

The CPU 17a selects the track data to be reproduced based on the control signal input at step ST27.

Step ST29

The data transmission circuit 20 transmits the track data and the control data toward the TV 4 based on the input of the input device 15 operated at step ST27. The TV 4 receiving the track data and the control data reproduces the track and outputs it from the audio output part (speaker).

As explained above, the mobile audio player 1a of the present embodiment can make the TV 4 reproduce a track by just operating the mobile audio player 1a without using the remote controller 5 of the TV 4. Further, in addition to the above description, it is possible to also operate the TV 4 from the mobile audio player 1a to for example change the mode to the external input mode and adjust the volume and sound quality on the TV side.

Third Embodiment

In the present embodiment, an explanation will be given of a slide show function of the mobile audio player 1b. Note that, it is assumed that the mobile audio player 1b of the present embodiment has the same configuration as that of the audio player 1 of the first embodiment except for a CPU 17b.

The image data of the present embodiment is an example of the image data of the present invention.

In the audio player 1b of the present embodiment, when the CPU 17b prepares a list of tracks, the data transmission circuit 20 transmits it to the TV 4 as the list data. The image data stored in the HDD 13 can be simultaneously transmitted and can be displayed in the display of the TV 4 simultaneously with the track list. Further, for example, it is also possible to switch and display a plurality of images any time or switch them by the operation of the user (slide show).

The processing of the mobile audio player 1b is for example as follows. First, when the CPU 17b prepares a list to be sent to the TV 4, the HDD 13 is simultaneously retrieved to detect the image data. This detection is carried out by retrieving for example the format of the file in the HDD 13 (for example jpeg).

Next, when the data transmission circuit 20 transmits the list data, it simultaneously also transmits the detected image data. The TV 4 receiving the list data and the image data displays the list on the display and simultaneously displays the image as background of the list.

As the image displayed at this time, the image data stored in the HDD 13 may be displayed at random, or an image previously linked with the track to be reproduced may be displayed.

As explained above, the mobile audio player 1b of the present embodiment can make the TV 4 display an image simultaneously with the list and can selectively display an image linked with the track. Due to this, the user can watch an image with a larger screen than that of the mobile audio player 1b and can enjoy music with speakers larger than those of the mobile audio player 1b. Note that the audio player 1b according to the present embodiment was made the same configuration as that of the audio player 1 of the first embodiment, but may have the same configuration as that of the audio player 1a of the second embodiment.

It should be understood by those skilled in the art that various modifications, combinations, sub-combinations and alterations may occur depending on design requirements and other factors insofar as they are within the scope of the appended claims or the equivalents thereof.

In the above first embodiment, the mobile audio player 1 and the TV 4 are connected by an AV cable or the like, while in the second embodiment, the mobile audio player 1a and the TV 4 are connected by infrared ray communication etc., but the present invention is not limited to these formats. Namely, they may be connected by any of an AV cable, infrared ray communication, and a wireless LAN. Further, in the above embodiments, the remote controller 5 is provided in the TV 4, but may be a general purpose remote controller for home AV systems. Further, in the above embodiments, track data was given as an example of the content data, but still image data, movie image data, etc. may be set as the content data. Further, in the above embodiments, the mobile audio players 1, 1*a*, and 1*b* were given as examples of the electronic apparatuses of the present invention, but for example a mobile phone may be used as the electronic apparatus of the present invention. Also, the above functions may be satisfied by linking accessories.

What I claim is:

1. A reproducing apparatus comprising:
    a memory;
    a processor;
    a recording part for recording and transferring content data;
    a reproduction part for reproducing the content data transferred from the recording part;
    an output part for outputting the reproduced content data;
    an interface for communicating with an external output device;
    an operation part for receiving audio control signals to adjust the volume and or sound quality produced by the external output device, wherein the operation part receives the audio control signals from a user input remote controller device associated with the external output device, and the user input remote controller device comprises a touch panel interface configured to:
        display one or more volume and or sound quality selection options,
        receive input through the touch panel interface associated with the one or more of the volume and or sound quality selection options, and
    the user input remote controller is configured to:
        adjust the volume and or sound quality produced by the external output device by
            adjusting the volume and or sound quality of an audio signal produced by the reproducing apparatus,
        wherein one or more of the volume and or sound quality selection options is associated with the adjustment of the volume and or sound quality of an audio signal produced by the reproducing apparatus, the association is stored in the memory, and selection of one or more of the volume and or sound quality selection options associated with the volume and or sound quality of the external output device does not operate the volume and or sound quality produced by the external output device;
    a display which displays operation screen data including volume and or sound quality information of the content data; and
    a control part for transmitting the content data to the external output device via the interface based on the received control signals, controlling the volume and or sound quality properties of the content data output by the external output device based on the received audio control signals, and displaying the operation screen data on the external output device and suspending the display of the operation screen data onto the display, when communication with the external output device is established via the interface.

2. A reproducing apparatus as set forth in claim 1, wherein the control part controls the output part to output the content data from the recording part based on an instruction input received by the operation part, when the processor determines that communication with the external output device has not been established.

3. A reproducing apparatus as set forth in claim 1, wherein the control part transmits the operation screen data through the interface to the external output device when the processor determines that communication with the external output device has been established.

4. A reproducing apparatus as set forth in claim 3, wherein the control part updates data relating to the operation screen data based on the instruction received by the operation part.

5. A reproducing apparatus as set forth in claim 3, wherein the operation screen data includes list data indicating a plurality of content data.

6. A reproducing apparatus as set forth in claim 5, wherein the control part reads out selected content data and transmits the read out selected content data via the interface to the external output device when an operation command for selecting predetermined content data from the list data is received by the operation part.

7. A reproducing apparatus as set forth in claim 5, wherein the control part generates a list of bookmarked data as operation screen data based on the bookmark data read out from the recording part and transmits the operation screen data via the interface to the external output device when communication with the external output device is established.

8. A reproducing apparatus as set forth in claim 3, wherein the recording part records image data, and
    the control part transmits the image data to the external output device through the interface linked with the operation screen data, and controls the external output device to display an image as a background, according to the image data.

9. A method of operating a content reproducing apparatus including a display, the method including:
    recording content data;
    reproducing content data based on the recorded content data;
    outputting the reproduced content data;
    establishing, via an interface of the content reproducing apparatus, communication with an external output device;
    receiving, via an operation part of the content reproducing apparatus, control signals indicative of operation instructions from a user input remote controller device associated with the external output device, the user input remote controller device comprising a touch panel interface configured to display one or more volume and or sound quality selection options, and to receive input through the touch panel interface associated with the one or more volume and or sound quality selection options;
    configuring the user input remote controller to adjust the volume and or sound quality produced by the external output device by adjusting volume and or sound quality of an audio signal produced by the reproducing apparatus;
    storing an association that associates at least one of the volume and or sound quality selection options with volume and or sound quality operations of the reproducing apparatus, wherein selecting the one or more of the volume and or sound quality selection options associated with the volume and or sound quality of the external output device does not operate the volume and or sound quality of the external output device;
    displaying operation screen data including volume and or sound quality information of the content data;

reading the recorded content data from a recording part of the content reproducing apparatus based on the operation instructions, and transmitting the content data, via the interface, to the external output device; and controlling, via the control part, the volume and or sound quality properties of the reproduction of the content data output by the external output device based on the audio control signals received from the user input remote controller device by the operation part.

10. A content reproduction system comprising a content reproducing apparatus and an external output device in communication with the content reproducing apparatus, wherein:

the reproducing apparatus comprises:

a data line for transferring data among connected parts, a recording part for recording and transferring content data, a reproduction part for reproducing the content data transferred from the recording part via the data line, an output part for outputting the reproduced content data, an interface for communicating with the external output device, an operation part connected to the data line for receiving audio control signals, wherein the operation part receives the audio control signals from a user input remote controller device associated with the external output device, the user input remote controller device comprising a touch panel interface configured to display one or more volume and or sound quality selection options, and to receive input through the touch panel interface associated with the one or more volume and or sound quality selection options, the user input remote controller is configured to adjust the volume and or sound quality produced by the external output device by adjusting the volume and or sound quality of an audio signal produced by the reproducing apparatus, wherein one or more of the volume and or sound quality selection options is associated with the volume and or sound quality operations of the reproducing apparatus, and the association is stored in a memory of the reproducing apparatus, wherein selection of the one or more volume and or sound quality selection options associated with the volume and or sound quality of the external output device does not operate the volume and or sound quality of the external output device, a display for displaying operation screen data including volume and or sound quality information of the content data, and a control part for transmitting the content data to the external output device via the interface based on the received control signals, and controlling volume and or sound quality properties of the content data output by the external output device based on the received audio control signals, and displaying the operation screen data onto the external output device and suspending the display of the operation screen data onto the display, when communication with the external output device is established via the interface; and the external output device comprises:

an input part for receiving as input the data from the reproducing apparatus via the interface, and an output part configured to output the content data transmitted from the reproducing apparatus.

\* \* \* \* \*